F. STAMBERGER.
Apparatus for Supplying Salt to Cattle.
No. 137,390. Patented April 1, 1873.
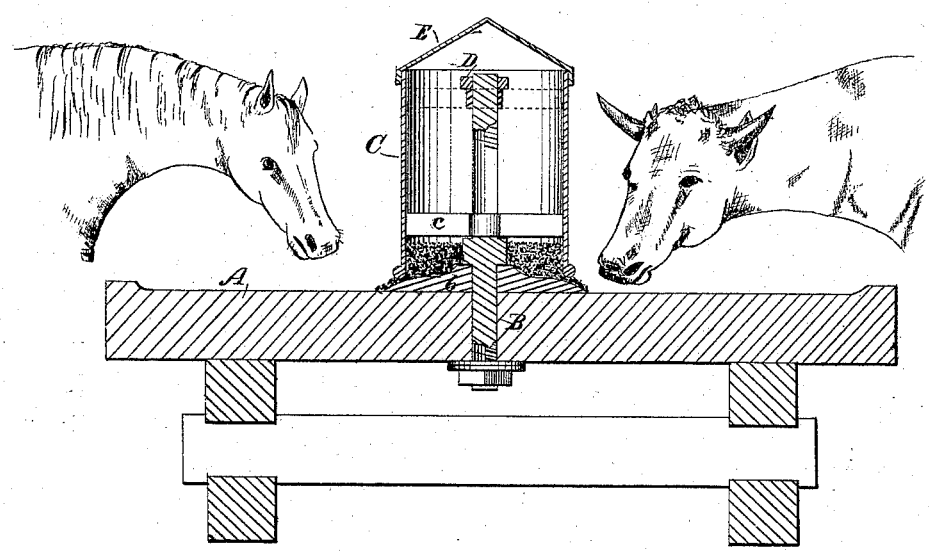
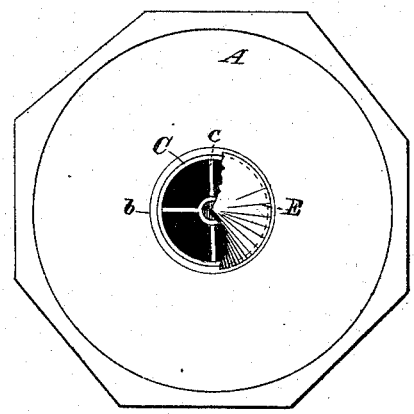
Witnesses:
Carrie C. Clark.
R. N. Dyer.
Inventor
Fredericks Stamberger
by Dyer, Beadle & Co,
Attorneys.

UNITED STATES PATENT OFFICE.

FREDRICK STAMBERGER, OF CLARION, ILLINOIS.

IMPROVEMENT IN APPARATUS FOR SUPPLYING SALT TO CATTLE.

Specification forming part of Letters Patent No. 137,390, dated April 1, 1873; application filed February 28, 1873.

*To all whom it may concern:*

Be it known that I, FREDRICK STAMBERGER, of Clarion, in the county of Bureau and State of Illinois, have invented a new and useful Device for Salting Cattle; and I do hereby declare that the following is a full and exact description of the same, reference being had to the accompanying drawing and to the letters of reference marked thereon.

This invention is designed for the purpose of feeding salt to cattle, sheep, &c.; and consists, mainly, of a suitably-supported feeding bed or table having a slight depression in its upper surface, which is provided with a central receptacle which is adapted to discharge its contents automatically upon the table in small quantities as it is eaten by the stock.

In the drawing, Figure 1 represents an elevation in section, and Fig. 2 a top plan view of the device.

Similar letters denote corresponding parts in each figure.

To enable others skilled in the art to make and use my invention I will now proceed to fully describe its construction.

A represents the feeding-table or bed suitably supported in any proper manner at the requisite distance from the ground. It is constructed preferably of stone or plank of any suitable size and shape, and has its surface provided with a slight depression, as shown. B represents a central shaft suitably secured to the table A, which has about its base an inclined collar or washer, *b*, as shown. C represents a cylinder, open at both ends, which is secured upon the shaft B in any suitable manner, but is preferably held by cross-arms *c*, having sockets adapted to slip over the shaft, as shown. It is held in such a position upon the shaft by washers or other proper means that its lower edge nearly but not quite touches the inclined surface of the collar *b*, a small space being left between them, as shown. D represents a securing-nut, by means of which the cylinder is held from being elevated, and consequently displaced, by accident. This construction permits the cylinder to revolve freely upon the central shaft. E represents a conical cap which is adapted to cover the upper end of the cylinder and securely protect its contents from the weather.

The operation of my machine will be readily understood. The cylinder, having been filled with salt, a small quantity will escape at its lower edge onto the inclined surface of the collar *b*, when it will be accessible to the cattle. As the salt is eaten away a new supply will be furnished from the cylinder, this supply being insured by its revolution, which is caused by the cattle in the act of licking up the salt.

This device may be constructed of any suitable dimension, but I have found the following, in practice, to make a convenient size. The feeding-bed four feet in diameter, six inches thick, with a depression of about one inch; collar *b*, ten inches in diameter, one inch thick; cylinder of boiler-iron, eight inches in diameter and ten inches high, giving it capacity to hold about one peck of salt; the central shaft one inch in diameter; the opening between the lower edge of the cylinder and the collar about one-half or three-fourths of an inch. This distance varies with the weather, kind of salt, &c.

This device is designed to be permanently located in the pastures or other proper point accessible to the stock. Its employment is advantageous, because the cattle can get the salt when they wish it, and without being compelled to use a place already made disagreeable by the saliva of others. The action of licking itself also causes the cylinder to discharge a fresh and clean supply.

Having thus fully described my invention, what I claim as new, and desire to secure by Letters Patent, is—

1. The combination of the feeding-table and the central revolving cylinder, substantially as described.

2. The table A, shaft B, collar *b*, and cylinder C with cap E, combined and arranged as described, for the purpose set forth.

This specification signed and witnessed this 24th day of February, 1873.

FREDRICK STAMBERGER.

Witnesses:
 HORATIO C. GIBBS,
 LUCIEN B. CROOKER.